United States Patent Office 3,038,917
Patented June 12, 1962

3,038,917
THERMALLY STABILIZED ALKYLLEAD COMPOUNDS
Shirl E. Cook and Hymin Shapiro, Baton Rouge, La., assignors to Ethyl Corporation, New York, N.Y., a corporation of Delaware
No Drawing. Filed May 25, 1960, Ser. No. 31,564
11 Claims. (Cl. 260—437)

This invention relates to the thermal stabilization of alkyllead compounds. More particularly, it relates to alkyllead compositions which are stable at temperatures as high as 180–195° C.

In U.S. 2,660,591–2,660,596, inclusive, there are described a series of inventions relating to the thermal stabilization of alkyllead compounds during various manufacturing and related operations. These prior inventions primarily related to the stabilization of tetraethyllead during the separation step in its manufacture wherein the tetraethyllead is distilled (100° C.) from the reaction products accompanying its synthesis. This objective was accomplished by using a small amount of a chemical compound described in those patents as a thermal stabilizer. So successful were these inventions that the problems connected with thermal instability of tetraethyllead in its manufacture and related operations have largely vanished. In fact, naphthalene has had a relatively long and very successful commercial career as a tetraethyllead thermal stabilizer for the above distillation operation.

More recently a new set of conditions and problems have arisen in connection with the thermal stabilization of alkyllead compounds. These have resulted from the pioneering discovery that pure—i.e. halogen scavenger-free—alkyllead compounds provide distinct and very important improvements in engine operation when dissolved in certain types of base fuels. This discovery is revolutionary. If put into commercial practice it would give rise for the first time to the sale in large-sized quantities of tetraalkyllead compounds undiluted by their conventional halide scavenger complement.

Prior commercial practice has been to provide alkyllead antiknock compounds blended with an organic halide scavenger complement. About 35 percent by weight of the commercial antiknock fluid compositions has been composed of either ethylene dibromide or a mixture of ethylene dibromide and ethylene dichloride as the scavenger. Although designed primarily to overcome certain engine problems, these scavengers have conferred upon the resultant antiknock fluid composition a very substantial degree of thermal stability. Consequently the elimination of such substantial amounts of scavenger components from the antiknock mixture results in the elimination of the thermal stability protection heretofore afforded by the scavenger. In fact, the resultant pure alkyllead compound is a liquid monopropellant—that is, it can undergo a spontaneous and highly exothermic decomposition, liberating a large volume of hot gas. Hence when a critical mass of alkyllead compound under partial confinement is brought up to a sufficient temperature, it will then heat itself up and explode.

The problem of effectively inhibiting the above-described thermal decomposition is critical to the commercialization of the new antiknock additive because in commercial use the additive would be shipped and stored in much the same way as present scavenger-containing alkyllead antiknock fluids. Unless the new antiknock additive were properly stabilized against thermal decomposition and unless it had essentially the same thermal stability as the presently-sold antiknock fluids, the consequences could be disastrous. Therefore, it has been concluded that the new scavenger-free alkyllead compositions must have pronounced stability at temperatures as high as 180–195° C. at which temperatures the decomposition rate of pure alkyllead compounds is normally extremely high.

Although, as shown by U.S. 2,660,595, naphthalene is a very effective thermal stabilizer of lead alkyls at 130° C., even this commercially successful thermal stabilizer has little or no effectiveness at 180° C. and is worthless at 195° C. Consequently there is a paramount need extant for an effective means of effectively stabilizing undiluted alkyllead compounds against thermal decomposition at temperatures in the range of 180–195° C.

An object of this invention is to fulfill the foregoing need. Another object is to provide alkyllead compositions which have substantial stability even at temperatures as high as 180–195° C. Other important objects of this invention will be apparent from the ensuing description.

The above and other objects of this invention are accomplished by providing an alkyllead compound normally susceptible to rapid thermal deterioration at temperatures in the range of 180–195° C. having admixed therewith an alcohol and an organic phosphate ester in amount sufficient to inhibit such decomposition. From an over-all cost effectiveness viewpoint the alcohol is preferably an alkanol containing from 1 to about 18 carbon atoms in the molecule and the organic phosphate ester is preferably one having in the molecule 3 organic ester groups, each of which contains from 1 to about 10 carbon atoms. Even more highly preferred thermal stabilizers of the compositions of this invention are the lower alkanols (i.e. the alcohols ranging from methanol through the various hexanols) used in combination with such phosphates as trimethyl phosphate, phenyl dimethyl phosphate, tolyl dimethyl phosphate, xylyl dimethyl phosphate, diphenyl methyl phosphate, ditolyl methyl phosphate, dixylyl methyl phosphate, triphenyl phosphate, tritolyl phosphate, trixylyl phosphate, tolyl diphenyl phosphate, phenyl ditolyl phosphate, etc., and mixtures of two or more of such compounds. Not only are these particularly preferred alkanols and phosphates extremely effective as thermal stabilizers when used in combination, but they exert profound beneficial effects upon the gasoline fuel composition in which the alkyllead compositions are ultimately employed. Furthermore, these highly important advantages are achieved at the lowest possible cost. Hence, the particularly preferred alkanols include methanol, ethanol, the propanols, the butanols, the pentanols, and the hexanols, with isopropanol being particularly outstanding from the standpoints of its very low cost and its exceedingly high effectiveness when used in combination with the phosphate esters. By the same token the most efficient and therefore the most preferred phosphate esters used in the practice of this invention can be considered as one or a mixture of compounds having the general formula

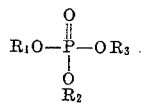

wherein $R_1$, $R_2$ and $R_3$ are radicals selected from the group consisting of methyl, phenyl, tolyl and xylyl. All of these esters cooperate with the alcohols to provide excellent alkyllead thermal stabilization, although certain of them—notably the aryl dimethyl phosphates—exhibit superior engine performance characteristics.

Among the features of this invention is the fact that the above mixtures confer upon the resultant scavenger-free alkyllead antiknock fluid excellent stability characteristics even at 180–195° C. where under normal circumstances explosive thermal decomposition would occur quite rapidly and with great violence. Furthermore, the compositions of this invention have thermal stability characteristics which are comparable to those of the presently sold scavenger-containing antiknock fluids. In addition the foregoing stability benefits are achieved at low cost, in fact in many instances at lower cost than the thermal stability achieved in the present day antiknock fluid compositions. Still another feature of this invention is the ready availability as articles of commerce of a great many of the compounds used in formulating the present thermal stabilizer combinations.

From a cost-effectiveness standpoint an outstanding composition of this invention is tetraethyllead containing from about 10 to about 25 weight percent of isopropanol and from about 5 to about 15 weight percent of trimethyl phosphate.

An especially unusual feature of this invention is the fact that when used by themselves the above alkanols have essentially no effectiveness whatsoever as thermal stabilizers for alkyllead compounds. In other words, the important benefits flowing from this invention definitely appear to be the result of a beneficial coaction between the phosphate ingredient and the normally insipid alkanol ingredient.

To illustrate the effectiveness of this invention, direct comparisons were made between the decomposition characteristics of unstabilized and stabilized tetraethyllead. The chief thermal decomposition products of alkyllead compounds are lead metal and hydrocarbon gas. Hence, a very good index of alkyllead thermal decomposition is liberation of this gas. Accordingly, a thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of either 180 or 195° C., the sample-containing tube was quickly immersed in the bath and clamped with the levelling bottle adjusted to hold the gas buret in place at a zero reading. Then measured was the time during which the sample was held at these high temperatures without pronounced thermal decomposition and consequent gas evolution occurring.

With pure tetraethyllead used in 1 milliliter amounts, pronounced thermal decomposition occurred practically instantaneously at 180 and 195° C. as evidenced by rapid gas evolution.

When alkanols such as isopropanol are blended with pure tetraethyllead to concentrations of 10, 15, or 20 percent by weight and the resultant mixtures subjected to the above test pronounced thermal decomposition occurs at 195° C. almost immediately.

The following examples wherein all percentages are by weight illustrate the compositions of this invention and the highly important technical advantages flowing therefrom.

EXAMPLE I

With pure tetraethyllead—i.e. halogen scavenger-free tetraethyllead—were blended 11.5 percent of an approximately equimolar mixture of phenyl dimethyl phosphate and methyl diphenyl phosphate, and 15 percent of isopropanol. The resultant tetraethyllead composition was subjected to the above-described test procedure at 195° C. and found to have over 15 times as much thermal stability as a system consisting of tetraethyllead and 23 percent of the same phosphorus compounds (no alcohol present).

EXAMPLE II

With pure tetraethyllead were blended 10 percent of isopropanol and 8.7 percent of a mixture composed predominantly of xylyl dimethyl phosphate and a lesser amount of dixylyl methyl phosphate. The resultant composition was then subjected to the above-described test procedure at 195° C. It was found that the foregoing stabilizer combination was well over 4 times as effective a thermal stabilizer as 8.7 percent of the same mixture of phosphorus compounds when used by itself with the tetraethyllead. In fact, the foregoing stabilizer combination was over twice as effective from the thermal stability standpoint as 17.4 percent of the phosphate ingredient when used by itself as a stabilizer for the tetraethyllead.

EXAMPLE III

Blended with pure tetraethyllead were 13.7 percent of cresyl diphenyl phosphate (commercial grade) and 10 percent of isopropanol. When the resultant composition was subjected to the thermal stability test at 195° C. it was found to be approximately 11 times as stable as a composition consisting of tetraethyllead and 13.7 percent of the cresyl diphenyl phosphate (no alcohol present).

EXAMPLE IV

Conjointly admixed with tetraethyllead were isopropanol (10 percent) and commercial grade tricresyl phosphate (15.4 percent). When tested at 195° C. this composition was found to be well over 3 times as stable as the corresponding alcohol-free composition.

EXAMPLE V

Mixed together were tetraethyllead, 5.9 percent of trimethyl phosphate and 20 percent isopropanol. When the resultant composition was subjected to the test procedure described above at 195° C. it was found to be about 7 times as thermally stable as an alcohol-free composition consisting of tetraethyllead and 11.8 percent of trimethyl phosphate.

It is seen from the foregoing examples that in every instance the isopropanol, which normally is totally without effectiveness as a thermal stabilizer, cooperated with the remainder of the components of the compositions of this invention in such a fashion as to markedly extend or magnify the thermal stability effectiveness of the system.

EXAMPLE VI

With pure tetraethyllead are conjointly blended 3.4 percent of triphenyl phosphate and 25 percent of isodecanol (mixed isomers). The resultant composition is then subjected to the above-described test procedure. It is found that the composition possesses excellent thermal stability characteristics.

EXAMPLE VII

Mixed together are tetraethyllead, 5 percent of methanol and 20 percent of trixylyl phosphate (mixed xylyl isomers). When the resultant composition is subjected to the above thermal stability test at 195° C. it is found that it possesses markedly improved stability as compared with pure tetraethyllead.

EXAMPLE VIII

Conjointly admixed with tetraethyllead are 3,9-diethyl-6-tridecanol (7.5 percent) and tributyl phosphate (12.0 percent). Subjection of the resultant composition to the above thermal stability test at 195° C. shows that the composition has substantially greater stability than the additive-free tetraethyllead.

EXAMPLE IX

Blended with pure tetraethyllead are 3.5 percent of 2-methyl-1-pentanol and 6.4 percent of triethyl phosphate. When the resultant composition is subjected to the above thermal stability test at 195° C. it is found that it possesses improved stability as compared with pure tetraethyllead.

EXAMPLE X

With pure tetraethyllead are blended 10 percent of diphenyl methyl phosphate and 20 percent of a mixture composed of various isomeric hexanols. Subjection of the resultant composition to the above thermal stability test at 195° C. shows that the composition has substantially greater stability than the additive-free tetraethyllead.

EXAMPLE XI

Mixed together are tetraethyllead, 25 percent of 2-ethylhexanol and 25 percent of phenyl dioctyl phosphate. The resultant composition is then subjected to the above-described test procedure. It is found that the composition possesses excellent thermal stability characteristics.

EXAMPLE XII

With pure tetraethyllead are blended 10 percent of isobutanol and 23 percent of a mixture composed predominantly of phenyl dimethyl phosphate and a lesser amount of diphenyl methyl phosphate. When the resultant composition is subjected to the above thermal stability test at 195° C. it is found that it possesses markedly improved stability as compared with pure tetraethyllead.

EXAMPLE XIII

Conjointly admixed with tetraethyllead are trimethyl phosphate (12 percent) and butanol (8 percent). When the resultant composition is subjected to the above thermal stability test at 195° C. it is found that it possesses markedly improved stability as compared with the pure tetraethyllead.

EXAMPLE XIV

With pure tetraethyllead are blended 10 percent of 2,6-dimethyl-4-heptanol and 20 percent of a mixture of isomeric tridecyl phosphates. Subjection of the resultant composition to the above thermal stability test at 195° C. shows that the composition has substantially greater stability than the pure tetraethyllead.

EXAMPLE XV

Mixed together are tetraethyllead, 30.8 percent of tricresyl phosphate and 8.0 percent of 2,6,8-trimethyl-4-nonanol. The resultant composition is then subjected to the above-described test procedure. It is found that the composition possesses excellent thermal stability characteristics.

EXAMPLE XVI

With pure methyltriethyllead are blended 15 percent of tricumenyl phosphate and 20 percent of an equivolume mixture of n-propanol and isopropanol. Subjection of the resultant composition to the above thermal stability test at 195° C. shows that the composition has substantially greater stability than the pure alkyllead compound.

EXAMPLE XVII

Conjointly admixed with an alkyllead mixture composed of tetramethyllead (5.7 percent), methyltriethyllead (26.2 percent), dimethyldiethyllead (37.4 percent), ethyltrimethyllead (23.8 percent) and tetraethyllead (6.9 percent) are tri-(p-tert.butylphenyl)phosphate (5 percent) and 4-methyl-2-pentanol (20 percent). When the resultant composition is subjected to the above thermal stability test at 195° C. it is found that it possesses markedly improved stability as compared with the corresponding untreated alkyllead mixture.

EXAMPLE XVIII

Mixed together are tetraoctyllead, 35 percent of tri-(2-ethylhexyl)phosphate and 10 percent of 2,2-dimethyl-1-butanol. When the resultant composition is subjected to the above thermal stability test at 195° C. it is found that it possesses markedly improved stability as compared with the pure alkyllead compound.

EXAMPLE XIX

Conjointly admixed with tetramethyllead are 2,2,4-trimethyl-1-pentanol (15 percent) and trimethyl phosphate (7.5 percent). The resultant composition possesses excellent thermal stability characteristics especially as regards resistance to spark and shock initiated thermal decomposition.

EXAMPLE XX

With pure tetraethyllead are blended 40 percent of 7-ethyl-2-methyl-4-undecanol and 8 percent of tributoxyethyl phosphate. Subjection of the resulting composition to the above thermal stability test at 195° C. shows that the composition has substantially greater stability than the pure tetraethyllead.

To still further demonstrate the outstanding effectiveness of the compositions of this invention another series of experiments was conducted. In this instance a direct comparison was made of the thermal stability effectiveness of a typical composition of this invention and of the principal antiknock fluid formulation in commercial use today. This latter formulation is composed chiefly of tetraethyllead and about 37 percent by weight of a mixture of ethylene dibromide and ethylene dichloride. The test procedure used involved heating a sample of the test material inside of a closed bomb until the composition underwent complete thermal decomposition and measuring the pressures built up during the course of this decomposition. In short, these tests involved the study of the adiabatic thermal decomposition of the alkyllead compound. Consequently these tests are representative of what could possibly occur in the event of a disaster associated with the storage of a quantity of an alkyllead antiknock composition in a closed vessel such as a storage or blending tank, tank car, or the like. Directly measured in these tests was the peak pressure produced during the decomposition, this measurement being obtained by equipping the bomb with a pressure guage. Consequently the higher the peak pressure the more violent was the decomposition. The results of these tests are presented in the following table.

*Table*

| Thermal Stabilizer | Superior Thermal Stability Characteristics of a Composition of This Invention as Compared with the Principal Commercial Antiknock Fluid in Commercial Use Today | |
|---|---|---|
| | Total Thermal Stabilizer Conc., Wt. Percent | Peak Pressure, P.s.i.g. |
| Ethylene dibromide (17.9%) + ethylene dichloride (18.8%). | 36.7 | [1] >2,500 |
| Isopropanol (17.5%) + trimethyl phosphate (5.9+). | 23.4 | 1,840 |

[1] Exact pressure unknown since the reading went off-scale at 2500 p.s.i.g.

It will be noted from the above results that the composition of this invention underwent a much less violent thermal deterioration than even the present day commercial antiknock fluid. It will also be noted that the concentration of the thermal stabilizers of this invention was substantially lower than the halogen scavenger concentration used in the present commercial antiknock fluid.

The thermal stabilizers of this invention have such effectiveness that even at trace quantities they produce a detectable improvement in thermal stability of scavenger-free alkyllead compounds, even at 195° C. However, it is generally preferable to employ from about 3 to about 45 percent by weight of the alcohol ingredient and from about 2 to about 50 percent by weight of the phosphate ester ingredient in order to achieve the maximum benefits characteristic of this invention. In other words, for every 100 parts by weight of alkyllead compound one should use from about 3 to about 45 parts by weight of the alcohol and from about 2 to about 50 parts of the phosphate ester. As a general rule, the concentration of the phosphate should be directly proportional to its molecular weight and the amount of the alcohol should be, when necessary, sufficient to provide a homogeneous solution which does not form separate phases at temperatures down to about −17° C. In addition, it is desirable that the total thermal stabilizer content of the compositions of this invention range from about 5 to about 50 percent based on the weight of the alkyllead compound. In other words, from a storage and shipment point of view it is desirable to use a minor proportion of the thermal stabilizer compositions of this invention. It will be understood, however, that departures can be made from the foregoing concentration ranges without detracting substantially from the beneficial results herein described and without departing from the spirit and scope of the invention as defined in the appended claims.

The stabilizer ingredients of the compositions of this invention are preferably hydrocarbon phosphate esters and hydrocarbon-substituted monohydric aliphatic alcohols although certain substituent groups can be present without detracting significantly from their effectiveness. Thus such phosphates as halogen-substituted phosphates (e.g. tri-2-chloroethyl phosphate, 4-bromophenyl dimethyl phosphate, etc.); nitro-substituted phosphates (e.g. 4-nitrophenyl dipropyl phosphate, etc.); amino-substituted phosphates (e.g. tri-(2,4-diaminophenyl)phosphate, etc.); oxygen-substituted phosphates (e.g. tri-2-ethoxyethylphosphate, etc.) and the like can be successfully used in the practice of this invention. Similarly the alcohols can be such compounds as mercaptoalcohols (e.g. 2-mercaptoethanol, etc.); oxy-alcohols (e.g. butoxyethanol, tetrahydropyran-2-methanol, etc.); and the like. By the same token the ingredients of the stabilizers of this invention can be mixtures of alcohols, mixtures of phosphates, or both. Fusel oil phosphate, $C_4$ to $C_{10}$ plasticizer alcohols, and so forth, serve as examples.

If desired, the stabilizer combinations of this invention can be used in conjunction with previously-known alkyllead thermal stabilizers such as 1,2,3,4-tetrahydronaphthalene, anthracene, and naphthalene.

Methods for the preparation of the stabilizer ingredients used in the practice of this invention are well known to those skilled in the art. In fact most of the foregoing ingredients are readily available as articles of commerce.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition at 180–195° C. by incorporating therewith a thermal stabilizer mixture of this invention.

What is claimed is:

1. A halogen scavenger-free alkyllead composition consisting essentially of an alkyllead compound normally susceptible to rapid decomposition at temperatures in the range of 180–195° C. having admixed therewith an alcohol and an organic phosphate ester in amounts sufficient to inhibit such decomposition; said alcohol being an alkanol having the formula ROH where R is an alkyl group containing from 1 to about 18 carbon atoms; said organic phosphate ester having the formula

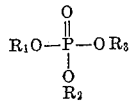

where $R_1$, $R_2$ and $R_3$ are radicals which each contain from 1 to about 10 carbon atoms and which are selected from the group consisting of alkyl, aryl and alkoxyalkyl radicals; said amounts being such that for every 100 parts by weight of said alkyllead compound there are present from about 3 to about 45 parts by weight of said alkanol and from about 2 to about 50 parts by weight of said organic phosphate ester.

2. A halogen scavenger-free alkyllead composition consisting essentially of an alkyllead compound normally susceptible to rapid decomposition at temperatures in the range of 180–195° C. having admixed therewith an alcohol and an organic phosphate ester in amounts sufficient to inhibit such decomposition, said alcohol being an alkanol having the formula ROH where R is an alkyl group containing from 1 to about 6 carbon atoms, said organic phosphate ester being one having the formula

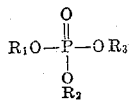

wherein $R_1$, $R_2$ and $R_3$ are radicals selected from the group consisting of methyl, phenyl, tolyl and xylyl, said amounts being such that for every 100 parts by weight of said alkyllead compound there are present from about 3 to about 45 parts by weight of said alkanol and from about 2 to about 50 parts by weight of said organic phosphate ester.

3. The composition of claim 1 wherein said alkanol is isopropanol.

4. The composition of claim 1 wherein said organic phosphate ester is selected from the group consisting of trimethyl phosphate, phenyl dimethyl phosphate, tolyl dimethyl phosphate, xylyl dimethyl phosphate, diphenyl methyl phosphate, ditolyl methyl phosphate, dixylyl methyl phosphate, triphenyl phosphate, tritolyl phosphate, trixylyl phosphate, tolyl diphenyl phosphate, phenyl ditolyl phosphate, and mixtures thereof.

5. The composition of claim 1 wherein said alcohol is isopropanol and said organic phosphate ester is trimethyl phosphate.

6. The composition of claim 1 wherein said alcohol is isopropanol and said organic phosphate ester is a mixture consisting essentially of phenyl dimethyl phosphate and diphenyl methyl phosphate.

7. The composition of claim 1 wherein said alcohol is isopropanol and said organic phosphate ester is tricresyl phosphate.

8. The composition of claim 1 wherein said alcohol is isopropanol and said organic phosphate ester is cresyl diphenyl phosphate.

9. The composition of claim 1 in which said alkyllead compound is tetraethyllead.

10. The composition of claim 2 in which said alkyllead compound is tetraethyllead.

11. Halogen scavenger-free tetraethyllead containing by weight about 10 to about 25 percent of isopropanol and about 5 to about 15 percent of trimethyl phosphate.

References Cited in the file of this patent

UNITED STATES PATENTS

| | | |
|---|---|---|
| 2,660,592 | Calingaert | Nov. 24, 1953 |
| 2,688,628 | Shapiro et al. | Sept. 7, 1954 |
| 2,848,471 | Pagliarini | Aug. 19, 1958 |